(12) United States Patent
Sangameswaran et al.

(10) Patent No.: US 10,480,477 B2
(45) Date of Patent: Nov. 19, 2019

(54) ELECTRIC CURRENT BASED ENGINE AUTO STOP INHIBIT ALGORITHM AND SYSTEM IMPLEMENTING SAME

(75) Inventors: Sangeetha Sangameswaran, Canton, MI (US); Kevin Roy Harpenau, Peachtree City, GA (US); Kirk Pebley, Novi, MI (US); David Celinske, Wolverine Lake, MI (US); Eric Michael Rademacher, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1754 days.

(21) Appl. No.: 13/179,747

(22) Filed: Jul. 11, 2011

(65) Prior Publication Data

US 2013/0018569 A1 Jan. 17, 2013

(51) Int. Cl.
*F02N 11/08* (2006.01)
*F02N 11/04* (2006.01)

(52) U.S. Cl.
CPC .......... *F02N 11/0825* (2013.01); *F02N 11/04* (2013.01); *F02N 2200/062* (2013.01); *F02N 2200/0809* (2013.01); *Y02T 10/48* (2013.01); *Y02T 10/7258* (2013.01)

(58) Field of Classification Search
CPC .. F02N 11/08; F02N 11/0814; F02N 11/0818; F02N 11/0825; B60W 20/106; F02D 41/042
USPC ............ 123/179.4, 198 D, 198 DB, 198 DC; 701/41, 112, 113
See application file for complete search history.

(56) References Cited

U.S. PATENT DOCUMENTS

| | | | |
|---|---|---|---|
| 4,021,677 A | 5/1977 | Rosen et al. | |
| 4,284,053 A | 8/1981 | Merrick | |
| 4,408,582 A | 10/1983 | Merrick | |
| 4,467,671 A | 8/1984 | Hasegawa | |
| 4,479,472 A | 10/1984 | Shimamura | |
| 4,520,271 A * | 5/1985 | Goertler | B60S 1/08 123/179.3 |
| 4,625,281 A | 11/1986 | Deutsch | |
| 4,788,487 A | 11/1988 | Picklesimer | |
| 4,836,164 A | 6/1989 | Morozumi et al. | |

(Continued)

FOREIGN PATENT DOCUMENTS

CN 102877961 A 1/2013
DE 3307220 9/1984

(Continued)

OTHER PUBLICATIONS

"NPL_A_Guide_To_Battery_Specifications_Dec2008"; retreived from the internet Dec. 19, 2018; http://web.mit.edu/evt/summary_battery_specifications.pdf; published Dec. 2008 (Year: 2008).*

*Primary Examiner* — Sizo B Vilakazi
*Assistant Examiner* — Brian R Kirby
(74) *Attorney, Agent, or Firm* — David B. Kelley; Brooks Kushman P.C.

(57) ABSTRACT

A vehicle includes an engine and at least one controller. The at least one controller periodically determines an estimated current to be demanded by vehicle electrical loads during an auto stop of the engine, compares the estimated current with a threshold current, and inhibits an auto stop of the engine if the estimated current is greater than the threshold current for a predetermined period of time.

8 Claims, 2 Drawing Sheets

(56) References Cited

U.S. PATENT DOCUMENTS

| | | | |
|---|---|---|---|
| 4,898,005 A | 2/1990 | Sakurai | |
| 5,072,597 A | 12/1991 | Bromley et al. | |
| 5,163,399 A | 11/1992 | Bolander et al. | |
| 5,216,895 A | 6/1993 | Kawai et al. | |
| 5,336,932 A * | 8/1994 | Barske | B60K 6/44 290/1 R |
| 5,365,445 A | 11/1994 | Takizawa | |
| 5,463,993 A | 11/1995 | Livshits et al. | |
| 5,559,704 A | 9/1996 | Vanek et al. | |
| 5,806,485 A | 9/1998 | DeGeorge | |
| 6,019,183 A * | 2/2000 | Shimasaki | B60K 6/48 180/165 |
| 6,037,749 A | 3/2000 | Parsonage | |
| 6,226,585 B1 | 5/2001 | Cullen | |
| 6,316,842 B1 * | 11/2001 | Kuroda | B60K 6/48 290/40 C |
| 6,379,283 B1 | 4/2002 | Cullen | |
| 6,429,539 B1 | 8/2002 | Suzuki et al. | |
| 6,553,958 B1 | 4/2003 | Kolmanovsky et al. | |
| 6,564,765 B2 * | 5/2003 | Kuroda | F02N 11/0825 123/179.4 |
| 6,564,774 B2 | 5/2003 | Ellims et al. | |
| 6,570,266 B1 * | 5/2003 | Wakashiro | B60K 6/485 290/40 C |
| 6,608,394 B2 | 8/2003 | Osada et al. | |
| 6,624,529 B2 * | 9/2003 | Obayashi | H02J 1/14 290/40 B |
| 6,668,224 B2 | 12/2003 | Kawai et al. | |
| 6,755,032 B1 | 6/2004 | Kotwicki et al. | |
| 6,763,296 B2 | 7/2004 | Aldrich, III et al. | |
| 6,805,090 B2 | 10/2004 | Bertness et al. | |
| 6,845,305 B1 | 1/2005 | Raftari et al. | |
| 6,913,558 B2 * | 7/2005 | Mori | B60K 6/485 180/65.26 |
| 6,925,369 B2 * | 8/2005 | Obayashi | B60R 16/023 701/22 |
| 7,017,360 B2 | 3/2006 | Kotwicki et al. | |
| 7,032,393 B2 | 4/2006 | Tamai et al. | |
| 7,173,347 B2 * | 2/2007 | Tani | B60R 16/0315 307/10.1 |
| 7,347,175 B2 * | 3/2008 | Lupo | F02D 41/042 123/179.4 |
| 7,503,413 B2 * | 3/2009 | Jiang | B60K 6/48 180/65.28 |
| 7,516,811 B2 * | 4/2009 | Kolpasky | G06F 3/0238 180/315 |
| 7,552,705 B2 | 6/2009 | Serkh et al. | |
| 7,635,922 B2 | 12/2009 | Becker | |
| 7,665,557 B2 * | 2/2010 | Hughes | B60K 6/48 180/65.28 |
| 7,745,953 B2 | 6/2010 | Puccetti et al. | |
| 8,205,594 B2 | 6/2012 | Fore et al. | |
| 8,406,954 B2 | 3/2013 | Whitney et al. | |
| 8,552,688 B2 * | 10/2013 | Ueda | B60W 10/06 320/132 |
| 8,560,202 B2 | 10/2013 | Pebley et al. | |
| 2002/0113441 A1 * | 8/2002 | Obayashi | H02J 1/14 290/40 C |
| 2003/0018415 A1 | 1/2003 | Sonobe et al. | |
| 2003/0233835 A1 | 12/2003 | Tomita et al. | |
| 2004/0084232 A1 * | 5/2004 | Obayashi | H02J 1/14 180/65.28 |
| 2004/0112074 A1 | 6/2004 | Komura et al. | |
| 2004/0231315 A1 * | 11/2004 | Gonzalez | B60K 3/00 60/202 |
| 2005/0044873 A1 | 3/2005 | Tamai et al. | |
| 2005/0193747 A1 | 9/2005 | Kajimoto et al. | |
| 2005/0285445 A1 * | 12/2005 | Wruck | H02J 1/14 307/10.1 |
| 2006/0028778 A1 | 2/2006 | O'Gorman et al. | |
| 2006/0116797 A1 * | 6/2006 | Moran | B60K 6/12 701/22 |
| 2006/0137643 A1 | 6/2006 | Thompson et al. | |
| 2007/0007056 A1 | 1/2007 | Bowers et al. | |
| 2007/0080006 A1 * | 4/2007 | Yamaguchi | B60K 6/28 180/65.31 |
| 2007/0170778 A1 * | 7/2007 | Yamaguchi | B60K 1/00 307/10.1 |
| 2007/0225882 A1 * | 9/2007 | Yamaguchi | B60W 30/095 701/36 |
| 2007/0255488 A1 | 11/2007 | Okubo et al. | |
| 2008/0306670 A1 * | 12/2008 | Masterson | B60K 6/26 701/99 |
| 2009/0015203 A1 | 1/2009 | Oakes | |
| 2009/0018707 A1 | 1/2009 | Oakes | |
| 2009/0024264 A1 | 1/2009 | Aldrich, III et al. | |
| 2009/0241883 A1 * | 10/2009 | Nagoshi | F02N 11/0825 123/179.4 |
| 2010/0042277 A1 | 2/2010 | Naik et al. | |
| 2010/0050671 A1 | 3/2010 | Kahn et al. | |
| 2010/0125383 A1 | 5/2010 | Caouette | |
| 2010/0145562 A1 | 6/2010 | Moran | |
| 2010/0163220 A1 | 7/2010 | Nakajima | |
| 2010/0217484 A1 * | 8/2010 | Mizuno | F02N 11/0818 701/36 |
| 2010/0222973 A1 * | 9/2010 | Senda | B60W 10/02 701/54 |
| 2010/0269776 A1 * | 10/2010 | Mizuno | F02D 29/06 123/179.4 |
| 2012/0083988 A1 | 4/2012 | Miyata et al. | |
| 2012/0109469 A1 | 5/2012 | Pebley et al. | |
| 2012/0253595 A1 | 10/2012 | Oakes | |
| 2012/0271525 A1 | 10/2012 | Bucci et al. | |
| 2012/0304670 A1 | 12/2012 | Kumar et al. | |
| 2013/0060444 A1 | 3/2013 | Matsunaga et al. | |
| 2013/0173142 A1 * | 7/2013 | Kato | F02D 29/02 701/112 |
| 2013/0226440 A1 | 8/2013 | Rademacher et al. | |

FOREIGN PATENT DOCUMENTS

| | | | | |
|---|---|---|---|---|
| EP | 2138712 A1 | 12/2009 | | |
| JP | 58209613 | 12/1983 | | |
| JP | 10304503 A | 11/1998 | | |
| JP | 10325346 A * | 12/1998 | | F02D 29/02 |
| JP | H10325346 A * | 12/1998 | | |
| JP | H10325436 A * | 12/1998 | | |
| JP | 2001173480 A * | 6/2001 | | Y02T 10/6286 |
| JP | 2001173480 A * | 6/2001 | | F02D 29/02 |
| JP | 2006097648 A * | 4/2006 | | |
| JP | 2006220113 A * | 8/2006 | | Y02T 10/40 |
| JP | 2009007988 A * | 1/2009 | | |
| JP | 2009007998 A * | 1/2009 | | |
| JP | 2009243292 A * | 10/2009 | | Y02T 10/48 |
| JP | 2010116877 A * | 5/2010 | | |
| JP | 2010265785 A * | 11/2010 | | F02D 29/02 |
| WO | 2008089935 A1 | 7/2008 | | |

* cited by examiner

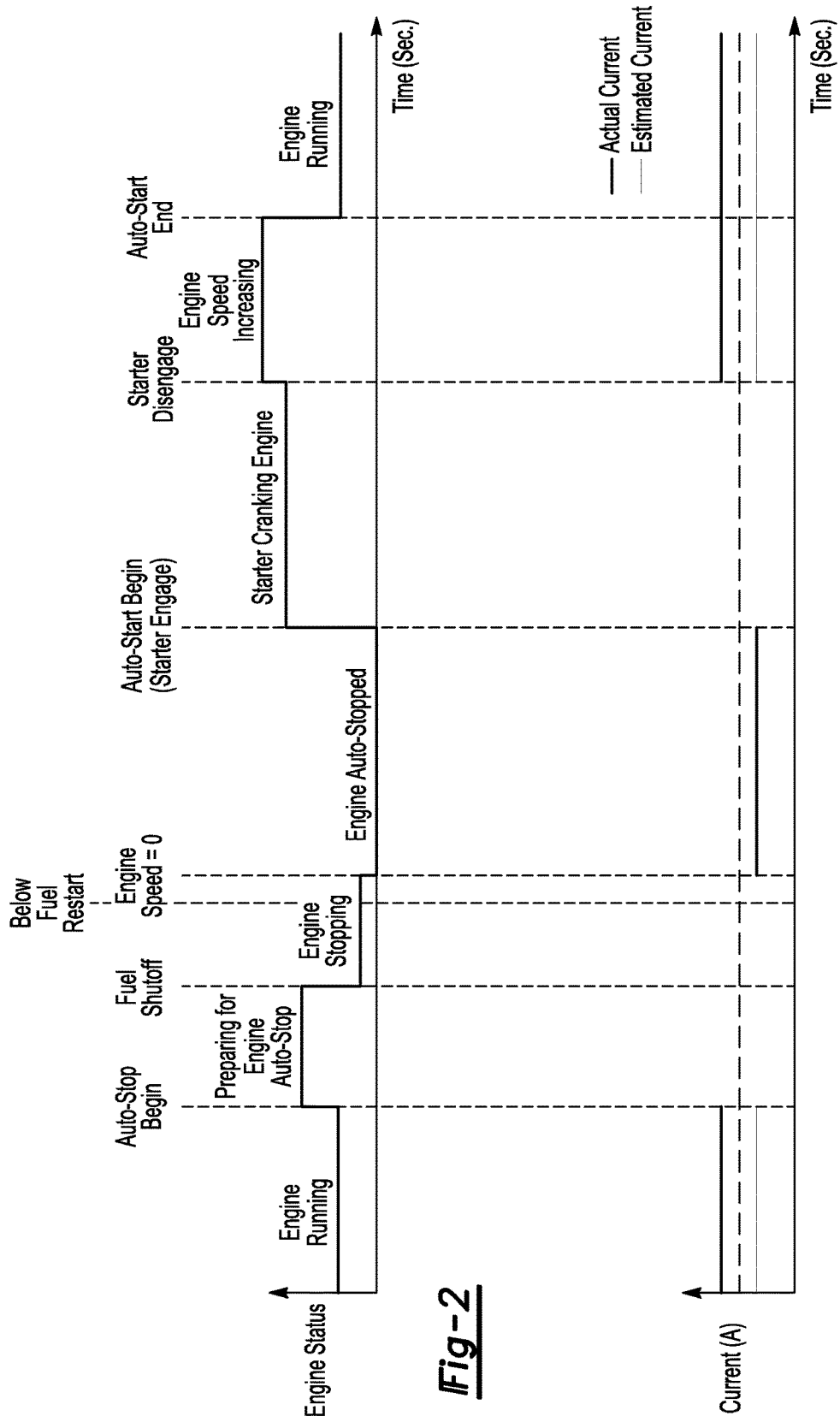

ELECTRIC CURRENT BASED ENGINE AUTO STOP INHIBIT ALGORITHM AND SYSTEM IMPLEMENTING SAME

TECHNICAL FIELD

This disclosure relates to techniques for determining whether to inhibit an engine auto stop based on estimates of electric current demand of electrical loads.

BACKGROUND

A micro-hybrid vehicle may stop its internal combustion engine for a period of time during intervals of a drive cycle when vehicle speed approaches or is equal to 0. These engine auto stops may improve fuel economy by reducing engine idle time (and thus fuel consumption) for the drive cycle.

SUMMARY

A vehicle may include an engine and at least one controller. The at least one controller may be configured to periodically determine an estimated current to be demanded by vehicle electrical loads during an auto stop of the engine, to compare the estimated current with a threshold current, and to inhibit an auto stop of the engine if the estimated current is greater than the threshold current for a predetermined period of time.

A vehicle may include an engine and at least one controller configured to detect an engine auto stop inhibit condition when an estimate of current to be demanded by vehicle electrical loads during an auto stop of the engine is greater than a threshold current. In response to detecting the engine auto stop inhibit condition, the at least one controller may prevent the engine from auto stopping.

A method for controlling an engine of a vehicle may include determining an estimated current to be demanded by vehicle electrical loads during an auto stop of the engine, comparing the estimated current with a threshold current, inhibiting an auto stop of the engine if the estimated current is greater than the threshold current, and allowing an auto stop of the engine if the estimated current is less than the threshold current.

BRIEF DESCRIPTION OF THE DRAWINGS

FIG. 2 is a plot of engine status versus time before, during and after an engine stop/start event.

FIG. 3 is a plot of actual and estimated system currents associated with the plot of FIG. 2.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
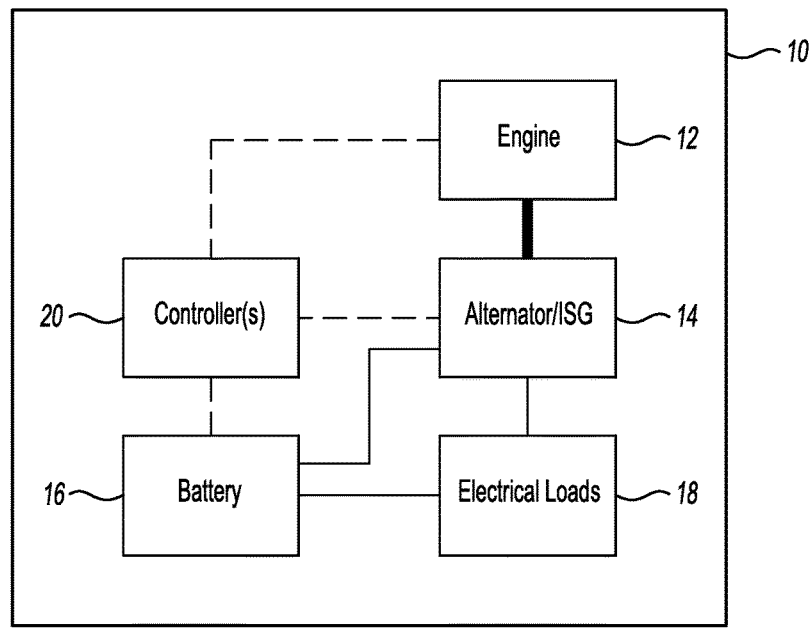
FIG. 1 is a block diagram of a micro-hybrid vehicle.

Referring to FIG. 1, a micro-hybrid vehicle 10 may include an engine 12, an alternator or integrated starter generator 14, a battery 16 (e.g., a 12 V battery), electrical loads 18 (e.g., pumps of a climate control system, a power steering assist system, etc.) in communication with/under the control of one or more controllers 20 (as indicated by dashed line). The engine 12 is mechanically connected with the alternator or integrated starter generator 14 (as indicated by heavy line) such that the engine 12 may drive the alternator or integrated starter generator 14 to generate electric current. The alternator or integrated starter generator 14 and battery 16 are electrically connected with each other and the electrical loads 18 (as indicated by thin line). Hence, the alternator or integrated starter generator 14 may charge the battery 16; the electrical loads 18 may consume electric current provided by the alternator or integrated starter generator 14 and/or battery 16.

The controllers 20 may initiate an auto stop or auto start of the engine 12. As the vehicle 10 comes to a stop, for example, the controllers 20 may issue a command to begin the process to stop the engine 12, thus preventing the alternator or integrated starter generator 14 from providing electric current to the electrical loads 18. The battery 16 may provide electric current to the electrical loads 18 while the engine 12 is stopped. As a brake pedal (not shown) is disengaged (and/or an accelerator pedal (not shown) is engaged) after an engine auto stop, the controllers 20 may issue a command to begin the process to start the engine 12, thus enabling the alternator or integrated starter generator 14 to provide electric current to the electrical loads 18.

Referring to FIG. 2, an engine auto stop event may include several stages: "auto-stop begin," which marks the beginning of the engine auto stop event; "preparing for engine auto-stop," which is the time period during which vehicle systems as well as the engine are prepared for the impending engine stop (if an auto stop inhibit condition is detected during this stage, the preparation for the impending engine stop is discontinued and the vehicle systems and engine are returned to their normal operating modes); "fuel shutoff," which marks the point at which fuel flow to the engine is stopped; "engine stopping," which is the time period during which the engine speed reduces to 0; "below fuel restart," which marks the point after which if a restart is requested during the "engine stopping" stage, the starter may need to be engaged to crank the engine (if a restart is requested before "below fuel restart" and during the "engine stopping" stage, the engine may be restarted by turning the flow of fuel back on); "engine speed=0," which marks the point at which the engine speed is near or equal to 0; "engine auto-stopped," which is the time period during which the engine is off; "starter engage," which marks the point at which the starter starts to crank the engine in an effort to start the engine (in response to detecting an engine auto start condition); "starter cranking engine," which is the time period during which the engine is unable to crank under its own power; "starter disengage," which marks the point at which the engine is able to crank under its own power; "engine speed increasing," which is the time period during which the speed of the engine increases to its running speed (a speed at or above target idle speed); and, "auto-start end," which marks the point at which the speed of the engine achieves its running speed.

Referring again to FIG. 1, the electrical loads 18 may be operative while the engine 12 is off during an engine stop/start event. For example, pumps associated with a climate control system may be on during this time period. Hence, the battery 16 may need to provide current to support these loads. The current demands of the electrical loads 18 during an engine stop/start event, however, may exceed the recommended capabilities of the battery 16. That is, voltage of the battery 16 may fall below a recommended limit while supporting the electrical loads 18 during an engine stop/start event. To prevent this situation from occurring, the controllers 20 may determine the current demands of the electrical loads 18 and compare them with a predetermined threshold. For example, values of current provided by the alternator or integrated starter generator 14 and battery 16 may be summed to determine the total current demand of the electrical loads 18. If the total current demand exceeds the predetermined threshold, the controllers 20 may inhibit any attempt to auto stop the engine 12. The predetermined threshold may be determined by testing, simulation, etc. and selected so as to preclude the voltage of the battery 16 from falling below a desired level.

The current demands of certain of the electrical loads 18 may depend on whether the engine 12 is on or off. For example, the current demands of an engine cooling fan or fuel pump may decrease to 0 while the engine 12 is off during an engine stop/start event. Likewise, the current demands of pumps associated with a climate control system may decrease while the engine 12 is off during an engine stop/start event. Current demands of other subsystems, however, may increase while the engine 12 is off during an engine stop/start event. Hence, the net value of the current demands of the electrical loads 18 may either decrease or increase once the engine 12 has been auto stopped.

Inhibiting engine auto stops based on actual values of current provided by the alternator or integrated starter generator 14 and battery 16 prior to an engine stop/start event may result in fewer engine auto stops and less than optimal fuel economy because current demands of the electrical loads 18 may decrease once the engine 12 has been auto stopped. Hence, estimates of change in current usage of the electrical loads 18 during an engine stop/start event may be used in making the decision as to whether to inhibit an engine auto stop. That is, change in current demands of the electrical loads 18 that result from stopping the engine 12 may be quantified by testing, simulation, etc. and made available to the controllers 20 so that the decision as to whether to inhibit an auto stop of the engine 12 may be based on an estimate of the current demands of the electrical loads 18 while the engine 12 is off.

Referring to FIG. 3, the actual system current and estimated system current may be determined continually/periodically prior to an engine auto stop. For example, the actual or net system current (as indicated by thick line) may be determined by summing values of current provided by the alternator or integrated starter generator 14 and battery 16. The estimated system current (as indicated by thin line) may be calculated by subtracting (or adding) the expected reduction (or increase) in current demands that accompany an engine auto stop from the actual system current. The expected reduction (or increase) in current demands that accompany an engine auto stop information may be stored in memory and accessed as needed, or detected by current sensors for example. The estimated system current may then be compared with a threshold current (as indicated by dashed line). If the estimated system current is greater than the threshold current, any attempt to initiate an engine auto stop may be inhibited (the engine will be prevented from auto stopping). If the estimated system current is less than the threshold current, any attempt to initiate an engine auto stop may not be inhibited (the engine may be allowed to auto stop). For example, an inhibit engine auto stop flag may be set according to the aforementioned comparison. Such a flag may be set to zero when the estimated system current is less than the current threshold, and may be set to one when the estimated system current is greater than the current threshold. This flag may then be checked as part of the standard routine for determining whether to initiate an engine auto stop.

In other examples, the estimated system current may need to be less than the threshold current for some predetermined time period (e.g., 3 seconds) before any attempt to initiate an engine auto stop is allowed. Likewise, the estimated system current may need to be greater than the threshold current for some predetermined time period before any attempt to initiate an engine auto stop is inhibited. Such strategies may be used to minimize the impact transient changes in current have on the decision as to whether to inhibit engine auto stops. Other scenarios are also contemplated.

Assuming the estimated system current is less than the threshold current, determination of the estimated system current may be suspended once an engine auto stop has been initiated. The system current may experience transient events as various vehicle subsystems prepare for engine shutdown. These transient events may interfere with the accuracy of any estimated system current determination. The value of the estimated system current determined just prior to the initiation of an engine shut down may thus be held until engine speed equals zero.

Once engine speed equals zero, the actual system current may be again continually/periodically determined. Electrical loads operative during the engine auto stop, in the example of FIG. 3, are controlled such that their current demands match those estimated prior to the initiation of the engine auto stop. That is, an engine cooling fan estimated to experience a 0.3 A reduction in operating current during an engine auto stop will be controlled so that it does experience a 0.3 A reduction in operating current during the engine auto stop, etc. This control scheme may continue until an engine auto start condition is detected (e.g., a driver steps on an accelerator pedal, the actual system current increases above the threshold current for some predetermined period of time, etc.) Actual system current may then increase as a starter is used to crank the engine. In certain examples such as the example of FIG. 3, determination of the actual system current is suspended while the starter is cranking the engine because of the amount of current required by the starter. Once the engine is operating under its own power, determinations of the actual and estimated currents may resume as described above.

Figure 4:
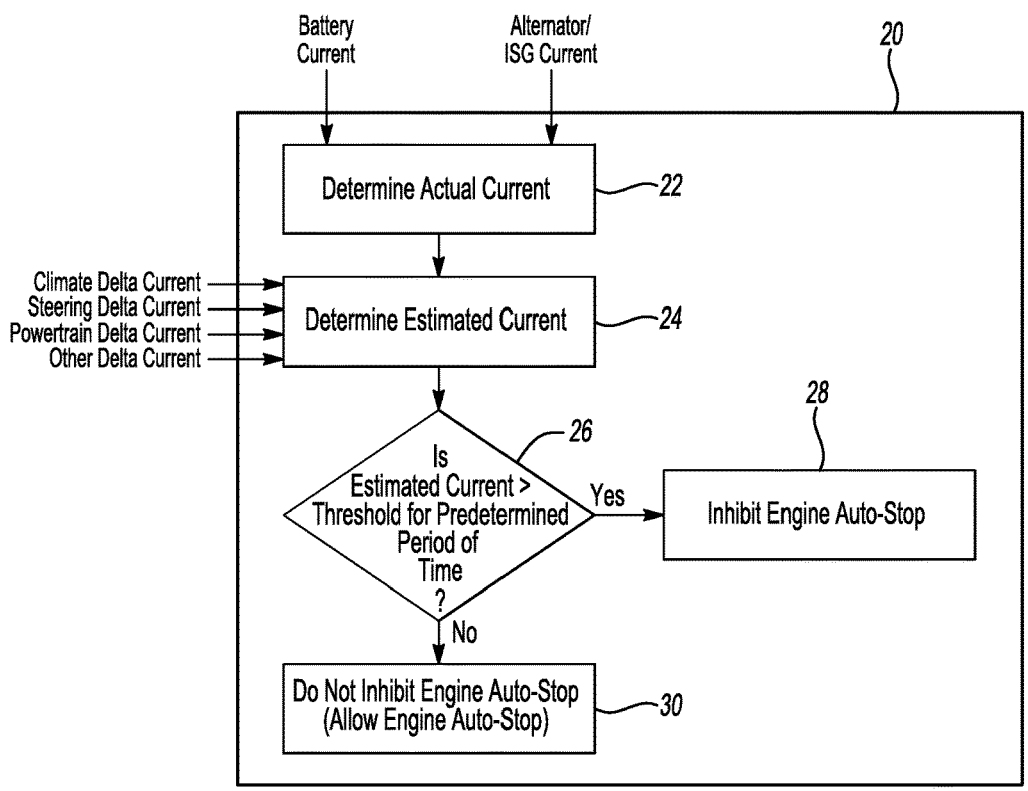
FIG. 4 is a flow chart of an algorithm for determining whether to inhibit an auto stop of an engine.

Referring to FIG. 4, an actual current may be determined at operation 22. For example, the controllers 20 may read information about battery current and alternator or integrated starter generator current available from a controller area network. Values associated with this information may be summed to calculate an actual current. At operation 24, an estimated current may be determined. The controllers 20, for example, may read information about reductions (or increases) in current expected to be experienced by any climate, steering and/or powertrain system, etc. during an engine shutdown and subtract this from (or add this to) the actual current to calculate an estimated current. At operation 26, it is determined whether the estimated current is greater than the threshold current. The controllers 20, for example, may compare the estimated current with the threshold current. If yes (an auto stop inhibit condition), an engine auto stop may be inhibited at operation 28. For example, the controllers 20 may prevent attempts to auto stop the engine 12. If no (an auto stop allow condition), an engine auto stop may be allowed at operation 30. For example, the controllers 20 may permit attempts to auto stop the engine 12.

The algorithms disclosed herein may be deliverable to/implemented by a processing device, such as the controllers 20, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), Field-Programmable Gate Arrays (FPGAs), state machines, or other hardware components or devices, or a combination of hardware, software and firmware components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    an engine; and
    at least one controller configured to inhibit an auto stop of the engine in response to expected increases and decreases to currents consumed by climate system accessory loads or power steering system accessory loads once the engine has been auto stopped resulting in an estimated current to be demanded by the vehicle accessory loads during an auto stop of the engine being greater than a threshold current.

2. The vehicle of claim 1 wherein inhibiting an auto stop of the engine includes preventing the engine from stopping.

3. The vehicle of claim 1 wherein the at least one controller is further configured to allow an auto stop of the engine in response to the estimated current being less than the threshold current.

4. A vehicle comprising:
    an engine; and
    a controller configured to detect an engine auto stop inhibit condition responsive to expected increases and decreases to currents consumed by vehicle accessory fan loads or vehicle accessory pump loads once the engine has been auto stopped resulting in an estimate of current to be demanded by the vehicle accessory loads during an auto stop of the engine being greater than a threshold current, and to prevent the engine from auto stopping.

5. The vehicle of claim 4 wherein the at least one controller is further configured to detect an engine auto stop permit condition responsive to the estimate of current being less than the threshold current, and to allow the engine to auto stop.

6. A method for controlling a vehicle engine comprising:
    inhibiting an auto stop of the engine responsive to expected changes to currents consumed by climate system accessory loads or power steering system accessory loads once the engine has been auto stopped resulting in an estimated current to be demanded by the vehicle accessory loads being greater than a threshold current; and
    allowing an auto stop of the engine responsive to the estimated current being less than the threshold current.

7. The method of claim 6 further comprising controlling the vehicle accessory loads during an auto stop of the engine such that the vehicle accessory loads consume an amount of current not greater than the estimated current.

8. The method of claim 6 wherein inhibiting an auto stop of the engine includes preventing the engine from stopping.

* * * * *